US010158644B2

(12) United States Patent
Thomas et al.

(10) Patent No.: US 10,158,644 B2
(45) Date of Patent: *Dec. 18, 2018

(54) TOKEN-BASED ROUTING FOR OUT-OF-NETWORK AUTHORIZATION

(71) Applicant: BANK OF AMERICA CORPORATION, Charlotte, NC (US)

(72) Inventors: Richard H. Thomas, Charlotte, NC (US); Joseph B. Castinado, Northglenn, CO (US)

(73) Assignee: Bank of America Corporation, Charlotte, NC (US)

( * ) Notice: Subject to any disclaimer, the term of this patent is extended or adjusted under 35 U.S.C. 154(b) by 190 days.

This patent is subject to a terminal disclaimer.

(21) Appl. No.: 15/151,821

(22) Filed: May 11, 2016

(65) Prior Publication Data

US 2017/0244708 A1    Aug. 24, 2017

Related U.S. Application Data

(60) Provisional application No. 62/299,140, filed on Feb. 24, 2016.

(51) Int. Cl.
*H04L 29/06* (2006.01)
*G06Q 20/38* (2012.01)
(Continued)

(52) U.S. Cl.
CPC ........... *H04L 63/102* (2013.01); *G06Q 20/10* (2013.01); *G06Q 20/3672* (2013.01);
(Continued)

(58) Field of Classification Search
CPC ..... H04L 63/10; H04L 63/08; H04L 63/0428; G06Q 20/385; G06Q 20/10; G06Q 20/065
See application file for complete search history.

(56) References Cited

U.S. PATENT DOCUMENTS 5,870,456 A    2/1999    Rogers
7,076,458 B2    7/2006    Lawlor et al.
(Continued)

OTHER PUBLICATIONS

Richard H. Thomas, et al., U.S. Appl. No. 15/151,777, Patent Application "Token-Based Routing for In-Network Authorization.", filed May 11, 2016.

(Continued)

*Primary Examiner* — Meng Li
(74) *Attorney, Agent, or Firm* — Michael A. Springs

(57) ABSTRACT

A token-based routing system that includes an out-of-network transfer processor configured to receive a transfer request, a sender token, and a receiver token and to identify an institution associated with a sender based on the sender token. The out-of-network transfer processor is configured to determine a membership for an institution associated with a receiver based on the receiver token. The out-of-network transfer processor is configured to facilitate a transfer from the institution associated with the sender to the receiver using service network resources in response to determining that the membership for the institution associated with the receiver indicates an in-network institution. The out-of-network transfer processor is configured to facilitate a transfer from the institution associated with the sender to the institution associated with the receiver using secondary network resources in response to determining that the membership for the institution associated with the receiver indicates an out-of-network institution.

12 Claims, 7 Drawing Sheets

(51) Int. Cl.
*G06Q 20/10* (2012.01)
*G06Q 20/36* (2012.01)
*G06Q 20/06* (2012.01)

(52) U.S. Cl.
CPC ....... *G06Q 20/3674* (2013.01); *G06Q 20/383* (2013.01); *G06Q 20/385* (2013.01); *H04L 63/04* (2013.01); *H04L 63/08* (2013.01); *H04L 63/0807* (2013.01); *H04L 63/10* (2013.01); *H04L 63/126* (2013.01); *G06Q 20/065* (2013.01); *H04L 63/0428* (2013.01)

(56) References Cited

U.S. PATENT DOCUMENTS

| | | | |
|---|---|---|---|
| 8,346,659 | B1 | 1/2013 | Mohsenzadeh |
| 8,423,453 | B1 | 4/2013 | Elliott |
| 8,650,118 | B2 | 2/2014 | Balasubramanian et al. |
| 2001/0011246 | A1* | 8/2001 | Tammaro ............... G06Q 20/10 705/38 |
| 2005/0027617 | A1* | 2/2005 | Zucker ............... G06F 17/30864 705/26.42 |
| 2007/0100748 | A1* | 5/2007 | Dheer ............... G06Q 20/10 705/39 |
| 2008/0288376 | A1 | 11/2008 | Panthaki et al. |
| 2009/0089211 | A1 | 4/2009 | Morse |
| 2010/0030687 | A1* | 2/2010 | Panthaki ............... G06Q 20/108 705/43 |
| 2010/0044430 | A1 | 2/2010 | Song et al. |
| 2011/0184858 | A1 | 7/2011 | Shakkarwar |
| 2014/0279525 | A1 | 9/2014 | Mohsenzadeh |
| 2015/0112866 | A1* | 4/2015 | Muthu ............... G06Q 20/385 705/44 |
| 2017/0148021 | A1* | 5/2017 | Goldstein ............ G06Q 20/401 |

OTHER PUBLICATIONS

Richard H. Thomas, et al., U.S. Appl. No. 15/151,859, Patent Application "Tokenization for Network Authorization Routing.", filed May 11, 2016.

* cited by examiner

TOKEN-BASED ROUTING FOR OUT-OF-NETWORK AUTHORIZATION

CROSS-REFERENCE TO RELATED APPLICATIONS

The present application claims benefit of U.S. Provisional Patent Application No. 62/299,140 filed Feb. 24, 2016 by Richard H. Thomas, et al., and entitled "TOKEN-BASED ROUTING FOR AUTHORIZATION," which is incorporated herein by reference as if reproduced in its entirety.

TECHNICAL FIELD

The present disclosure relates generally to network security, and more specifically to information security within a network.

BACKGROUND

Networks allow users from different institutions to have access to various types of network services for share information and transfer resources with each other. Some networks may not support certain types of network services which may causes challenges when transferring information resources across different networks. Networks may also be susceptible to attacks by unauthorized users trying to gain access to sensitive information being communicated across the network. Unauthorized access to a network may compromise the security of the data and information being communicated by the network. Thus, it is desirable to provide the ability to securely transfer information and resources among users that may be using different networks and/or types of network services.

SUMMARY

In one embodiment, the disclosure includes a token-based routing system that includes service network resources, secondary network resources, and an out-of-network transfer processor. The service network resources are associated with a service network and are configured to provide one or more services. The out-of-network transfer processor is communicatively coupled to the service network resources and the secondary network resources. The out-of-network transfer processor is configured to receive a transfer request, a sender token, and a receiver token and to identify an institution associated with a sender based on the sender token. The out-of-network transfer processor is further configured to send a transfer authorization request to the institution associated with the sender in response to receiving the transfer request and to receive a transfer authorization approval in response to sending the transfer authorization request. The out-of-network transfer processor is further configured to determine a membership for an institution associated with a receiver based on the receiver token. The out-of-network transfer processor is configured to facilitate a transfer from the institution associated with the sender to the receiver using the service network resources in response to determining that the membership for the institution associated with the receiver indicates an in-network institution. Facilitating the transfer from the institution associated with the sender to the institution associated with the receiver using the service network resources may comprise employing one or more services provided by the service network. The out-of-network transfer processor is configured to facilitate a transfer from the institution associated with the sender to the institution associated with the receiver using the secondary network resources in response to determining that the membership for the institution associated with the receiver indicates an out-of-network institution.

In another embodiment, the disclosure includes an apparatus that includes a network interface and an out-of-network transfer processor, implemented by a processor operably coupled to the network interface. The out-of-network transfer processor is configured to receive a transfer request, a sender token, and a receiver token and to identify an institution associated with a sender based on the sender token. The out-of-network transfer processor is further configured to send a transfer authorization request to the institution associated with the sender in response to receiving the transfer request and to receive a transfer authorization approval in response to sending the transfer authorization request. The out-of-network transfer processor is further configured to determine a membership for an institution associated with a receiver based on the receiver token. The out-of-network transfer processor is configured to facilitate a transfer from the institution associated with the sender to the receiver using service network resources in response to determining that the membership for the institution associated with the receiver indicates an in-network institution. Facilitating the transfer from the institution associated with the sender to the institution associated with the receiver using the service network resources may comprise employing one or more services provided by the service network resources. The out-of-network transfer processor is configured to facilitate a transfer from the institution associated with the sender to the institution associated with the receiver using secondary network resources in response to determining that the membership for the institution associated with the receiver indicates an out-of-network institution.

In yet another embodiment, this disclosure includes a token-based routing method that includes receiving a transfer request, a sender token, and a receiver token and identifying an institution associated with a sender based on the sender token. The method further includes sending a transfer authorization request to the institution associated with the sender in response to receiving the transfer request and receiving a transfer authorization approval in response to sending the transfer authorization request. The method further includes determining, by the out-of-network transfer processor, a membership for an institution associated with a receiver based on the receiver token. The method further includes facilitating, by the out-of-network transfer processor, a transfer from the institution associated with the sender to the receiver using service network resources in response to determining that the membership for the institution associated with the receiver indicates an in-network institution. Facilitating the transfer from the institution associated with the sender to the institution associated with the receiver using the service network resources may comprise employing one or more services provided by the service network resources. The method further includes facilitating a transfer from the institution associated with the sender to the institution associated with the receiver using secondary network resources in response to determining that the membership for the institution associated with the receiver indicates an out-of-network institution.

The present embodiment presents several technical advantages. In an embodiment a token-based routing system allow transfers to be authenticated and facilitated using tokens. Token-based routing allows user to make transfers using different types of network services over different networks. Authenticating and facilitating transfers using tokens provides information security by masking and/or reducing the amount of information used when performing a transfer. Using tokens to mask information that is communicated across the network may protect the users and their user information in the event unauthorized access to the network or data occurs.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
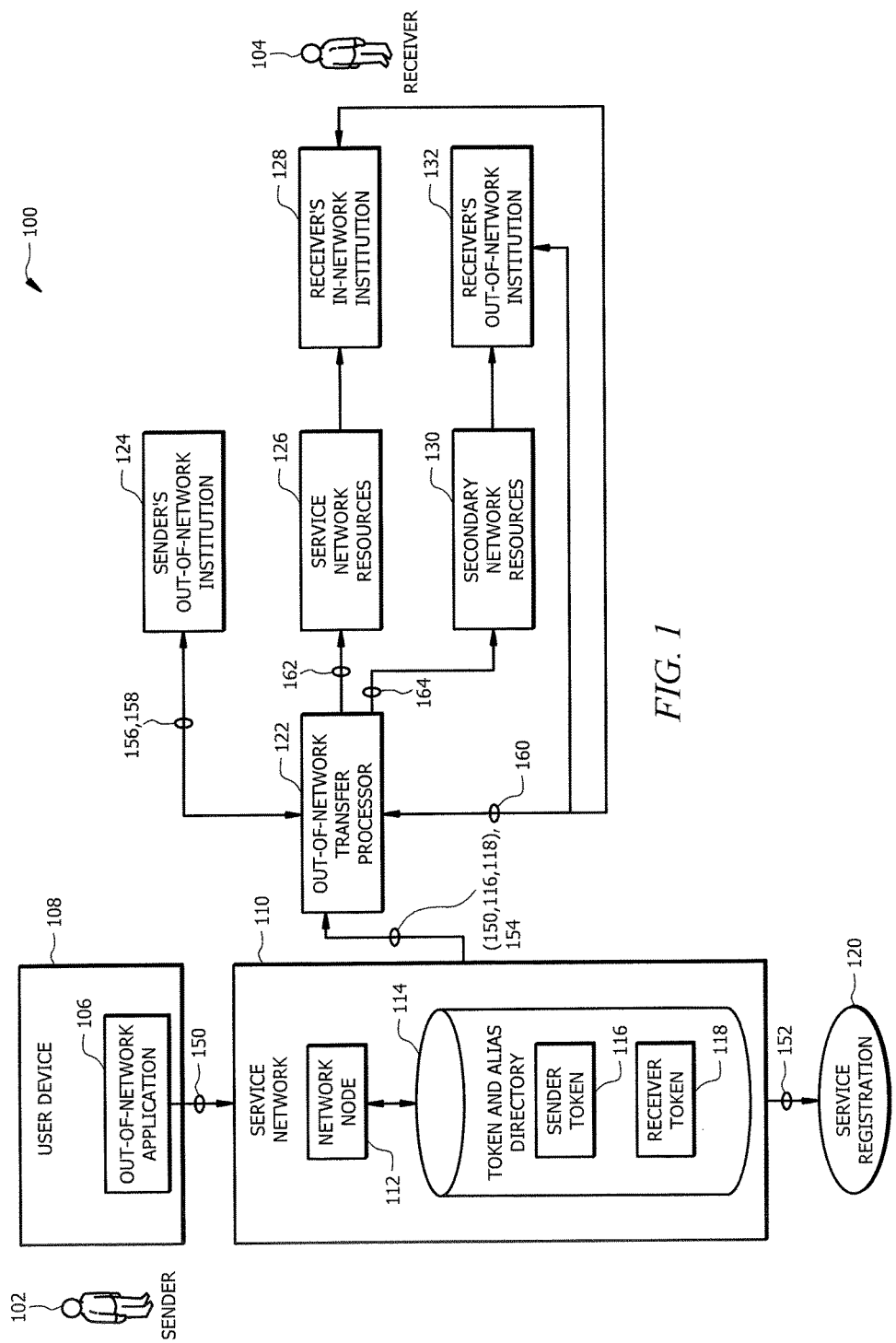
FIG. 1 is a schematic diagram of an embodiment of a token-based routing system configured to support out-of-network authorization.

Performing transfers among users across different types of network provides several technical problems and challenges. For example, different networks may provided different types of network services and some networks may not support certain types of network services. A sender may be unable to make a transfer to a receiver using certain types network services without prior knowledge about the receiver's network and access to network services. Additionally, using networks are susceptible to attacks by unauthorized users trying to gain access to sensitive information being communicated. Unauthorized access to a network may compromise the security of the information being communicated. For example, user information may be obtained or manipulated by an unauthorized user.

Token-based routing is a technique that employs tokens to perform out-of-network authorization and in-network authorization and to facilitate transfers among users. Token-based routing may be employed to authorize and facilitate transfers between users that may be members of institutions associated with different networks and/or configured to receive different types of network services. This provides a technical solution to the previously discussed technical problems and improves the network and computing devices in several ways. For example, using tokens provides information security by masking and/or reducing the amount of information used when performing a transfer. Using tokens to mask information that is communicated across the network may protect the users and their user information in the event unauthorized access to the network or data occurs. For example, a sender token and a receiver token may be used when authorizing and facilitating a transfer to protect the user information associated with the sender and the receiver. Token-based routing also allows a sender to make a transfer to a receiver without prior knowledge about the receiver's network and access to network services by using tokens (e.g. a receiver token).

In one embodiment, a token-based routing system may be employed to authenticate and facilitate a transfer between a sender and a receiver. The sender may provide user information to a network node of a service function to obtain tokens for performing the transfer. Tokens may comprise bit streams or coded data that is mapped to or associated with user information for the sender or the receiver. Tokens may be any suitable form or format as would be appreciated by one of ordinary skill in the art upon viewing this disclosure. Tokens may be configured to mask user information, and thereby protect user information being communicated across a network. The network node may use the sender token and the receiver token to determine whether an in-network transfer processor or an out-of-network transfer processor may perform the transfer. The in-network transfer processor or the out-of-network transfer processor may use the sender token and the receiver token to determine which resources and services to use when performing the transfer between the sender and the receiver. For example, the receiver token may indicate an institutions associated with the receiver and receiving options for the receiver which may be used for routing and executing the transfer.

In one embodiment, a tokenization system may be employed to generate a token for a user. The user may provide user information to a network node of a service network to initiate the generation of a token. The network node may authenticate the user and generate a token request for the user upon authenticating the user. The network node may send the token request to a tokenizer and may receive a token for the user in response to the token request. The token may be associated with one or more service of the service network and may be stored in a token and alias directory for the service network.

FIG. 1 is a schematic diagram of an embodiment of a token-based routing system 100 configured to support out-of-network authorization. A user may be a member of or associated with one or more institutions. Institutions may be members of or registered with a service network 110 that is configured to provide resources and/or support for network services such as real-time transfers. As an example, an in-network institution may be an entity that is a member of the service network 110 and configured to receive real-time transfer services from the service network 110. In this example, an out-of-network institution may be an entity that is not a member of the service network 110 and is not configured to receive real-time transfer services from the service network 110. Examples of institutions may include, but are not limited to, organizations, businesses, government agencies, financial institutions, and universities. A transferable resource is a resource that can be transferred from the sender 102 to the receiver 104. Examples of transferable resources include, but are not limited to, information, currency, files, and documents. Transferable resources may be associated with and identifiable using transferrable resource identifiers.

Out-of-network authorization may be employed when a sender 102 is a member of an out-of-network institution and requests to transfer a transferable resource to a receiver 104. A transfer from a sender 102 to a receiver 104 may refer to a transfer of transferable resources from the sender's institution to the receiver's institution. The receiver 104 may be a member of either an in-network institution or an out-of-network institution. The receiver 104 may be a user that has previously registered for services provided by the service network 110 or may be a user that has not registered with the service network 110. Examples of performing a transfer using out-of-network authorization are described in FIGS. 4 and 5.

The sender 102 may request to make a transfer to the receiver 104 using an out-of-network application 106 configured to authenticate the sender 102 and to initiate a transfer between the sender 102 and a receiver 104. For example, the out-of-network application 106 may be configured to authenticate the sender 102 using log-in credentials such as a user name and password or any other suitable techniques as would be appreciated by one of ordinary skill in the art upon viewing this disclosure. The out-of-network application 106 may be a stand alone application that is associated with an out-of-network institution or a third-party.

The out-of-network application 106 may be configured to store and/or access user information associated with the sender 102. User information may include, but is not limited to, user identifiers, aliases, tokens, names, addresses, email addresses, phone numbers, network information, institution information, financial information, services information, and user preferences. The out-of-network application 106 may be configured to allow the sender 102 to provide user information associated with the sender 102 and user information associated with the receiver 104 to generate a transfer request 150. The transfer request 150 may comprise user information associated with the sender 102, user information associated with the receiver 104, and a transferable resource identifier. The out-of-network application 106 may be further configured to send the transfer request 150 to the service network 110 to initiate a transfer between the sender 102 and the receiver 104.

As a non-limiting example, a sender 102 may request to transfer a currency to a receiver 104. The sender 102 employ the out-of-network application 106 to send a transfer request 150 that indicates to transfer a currency from the sender 102 to the receiver 104. For example, the transfer request 150 may comprise an identifier associated with the sender 102, a token (e.g. a dynamic primary account number (DPAN)) associated with debit card for the sender 102, an alias (e.g. an email address) for the receiver 104, and a transferrable resource identifier that indicates a currency amount. In other examples, the sender 102 may employ the out-of-network application 106 to send transfer requests 150 that indicate to transfer other types of transferable resource from the sender 102 to the receiver 104.

The out-of-network application 106 may be executed on a user device 108 in data communication with and configured to communicate with the service network 110. The user device 108 may be configured to communicate with the service network 110 via a wireless or wired connection. The user device 108 may employ any suitable type of connection for communicating with the service network 110 as would be appreciated by one of ordinary skill art upon viewing this disclosure. For example, the user device 108 may be configured to send transfer requests 150 to the service network 110 using an Internet connection. Examples of a user device 108 include, but are not limited to, notebook computers, tablet computers, desktop computers, mobile telephones, or any other suitable device as would be appreciated by one of ordinary skill in the art upon viewing this disclosure.

In one embodiment, the user device 108 may comprise a memory, a processor, a network interface, and an input/output (I/O) interface. For example, the memory may comprise one or more disks, tape drives, or solid-state drives, and may be used as an over-flow data storage device, to store programs when such programs are selected for execution, and to store instructions and data that is read during execution. The memory may comprise read-only memory (ROM), random-access memory (RAM), ternary content-addressable memory (TCAM), dynamic random-access memory (DRAM), and static random-access memory (SRAM). The processor may be implemented as one or more central processing unit (CPU) chips, logic units, cores (e.g. as a multi-core processor), field-programmable gate arrays (FPGAs), application specific integrated circuits (ASICs), or digital signal processors (DSPs). The processor is operably coupled to and in signal communication with the memory, the network interface, and the I/O interface. The processor is configured to receive and transmit electrical signals among one or more of the memory, the network interface, and the I/O interface. The processor is configured to process data and may be implemented in hardware or software. An I/O interface may comprise ports, transmitters, receivers, transceivers, or any other devices for transmitting and receiving data as would be appreciated by one of ordinary skill in the art upon viewing this disclosure. The network interface may be configured to enable wired and/or wireless communications and to communicate data through a network, virtual network, system, and/or domain.

The service network 110 may be configured to provide services and/or support for transferring transferrable resources among institutions. For example, the service network 110 may be configured to provide support for authentication, encryption, and real-time transfers between the sender 102 and the receiver 104. The service network 110 may be configured to provide any services as would be appreciated by one of ordinary skill in the art.

The service network 110 may comprise one or more network nodes 112 and a token and alias directory 114. The token and alias directory 114 may be or may comprise a memory or database. In one embodiment, the token and alias directory 114 may be integrated with network node 112. The token and alias directory 114 may be configured to store aliases and tokens associated with users. Stored aliases and token may be looked up and used during transfers among the users. The token and alias directory 114 is configured to provide information security for the service network 110 and users of the service network 110. For example, user information associated with senders 102 and receivers 104 may stored as aliases and tokens that are used during handoffs when performing transfers among users. The identity of the sender 102 and the receiver 104 may be unknown outside of the service network 110. Tokens may be generated by a token and alias generator (not shown) during a service registration process. An example of a service registration process in described in FIGS. 3 and 7.

The network node 112 is operably coupled to and in data communication with and communicatively coupled with the token and alias directory 114. The network node 112 may comprise a network interface and a processor operably coupled to the network interface. The network interface may be configured to allow the network node 112 to communicate (e.g. send and receive data) with other network device or computing devices over one or more networks. Examples of network nodes 112 include, but are not limited to, computers, network devices, modems, switches, routers, bridges, servers, and clients. Network nodes 112 may be configured to receive transfer requests 150, to process transfer requests 150 to determine how to facilitate a transfer between a sender 102 and a receiver 104 based on the transfer request 150, and to forward the transfer request 150 to initiate the transfer. The network node 112 is configured to determine whether the sender 102 is a member of an out-of-network institution or an in-network institution using user information provided in the transfer request 150. The network node 112 may be configured to access or interrogate the token and alias directory 114 using the user information for the sender 102 to identify a sender token 116 associated with the sender 102. For example, the network node 112 may be configured to use the user information for the sender 102 to look-up the sender token 116 in the token and alias directory 114. The sender token 116 may indicate whether the sender 102 is a member of an out-of-network institution or an in-network institution and/or information associated with the sender's institution.

The network node 112 is further configured to determine whether the receiver 104 is a member of the service network 110 and/or whether the receiver 104 is a member of an out-of-network institution or an in-network institution. The network node 112 may be configured to access or interrogate the token and alias directory 114 using the user information for the receiver 104 to identify a receiver token 118 associated with the receiver 104. The receiver token 118 may indicate whether the receiver 104 is a member of the service network 110 and/or information associated with the receiver's 104 institution. The receiver token 118 may further indicate information associated with the receiver such as user information, user preferences, enrolled services, and receiving options for transfers.

The network node 112 may be configured to forward the transfer request 150, the sender token 116, and the receiver token 118 to an out-of-network transfer processor 122 in response to determining that the sender 102 is a member of an out-of-network institution. In one embodiment, the network node 112 may be configured to encrypt the transfer request 150 prior to forwarding the transfer request 150 to the out-of-network transfer processor 122. In another embodiment, the network node 112 may combine the transfer request 150, the sender token 116, and the receiver 118 to generate a composite transfer request 154 and forward the composite transfer request 154 to the out-of-network transfer processor 122. Generating the composite transfer request 154 may comprise a transformation of the transfer request 150, the sender token 116, and/or the receiver token 118 to a different data type or format.

The network node 112 may be configured to send a registration request 152 to initiate a service registration 120 when the receiver 104 is not a member of the service network 110. In one embodiment, sending the registration request 152 may comprise sending a request for the receiver 104 to join the service network 110. An example of the service registration 120 is described in FIGS. 3 and 7.

The out-of-network transfer processor 122 may comprise a network interface and a processor operably coupled to the network interface. The network interface may be configured to allow the out-of-network transfer processor 122 to communicate (e.g. send and receive data) with other network device or computing devices over a network. Examples of the out-of-network transfer processor 122 include, but are not limited to, computers, network devices, modems, switches, routers, bridges, servers, and clients. The out-of-network transfer processor 122 is in data communication with and communicatively coupled to the service network 110, one or more network nodes 112, service network resource 126, and secondary network resources 130. The out-of-network transfer processor 122 may be associated with the service network 110, an in-network institution, an out-of-network institution, the sender's institution, the receiver's institution, or a third-party processor. The out-of-network transfer processor 122 is configured to receive the transfer request 150, the sender token 116, and the receiver token 118 and to facilitate a transfer between the sender 102 and the receiver 104 based on the transfer request 150, the sender token 116, and the receiver token 118.

The out-of-network transfer processor 122 may be configured to seek authorization from the sender's institution prior to performing a transfer. The out-of-network transfer processor 122 may be configured to send a transfer authorization request 156 to the sender's out-of-network institution 124 in response to receiving the transfer request 150, the sender token 116, and the receiver token 118. The out-of-network transfer processor 122 may be configured to use user information from the transfer request 150 and/or the sender token 116 to identify the sender's institution. The transfer authorization request 156 may be a request for authorization from the sender's institution to initiate a transfer from the sender 102. In an embodiment, the transfer authorization request 156 may comprise user information from the transfer request 150, the sender token 116, and/or the receiver token 118. The out-of-network transfer processor 122 may receive a transfer authorization approval 158 from the sender's institution which indicates an approval to the transfer authorization request 156 in response to the sending the transfer authorization request 156.

The out-of-network transfer processor 122 may be further configured to determine how to execute the transfer between the sender 102 and the receiver 104 based on the transfer request 150, the sender token 116, and/or the receiver token 118. For example, the out-of-network transfer processor 122 may be configured to determine receiving options, routing information, delivery speed requirements (e.g. real-time delivery), security requirements, and/or any other requirements or services associated with executing the transfer based on the receiver token 118. As an example of determining routing information, the out-of-network transfer processor 122 may be configured to use a routing table or tree and the receiver token 118 to determine how to route the transfer request 150. The out-of-network transfer processor 122 may be configured to use the user information from the transfer request 150 and/or the receiver token 118 to identify the receiver's institution, whether the receiver 104 is a member of an in-network institution or an out-of-network institution, and/or which resources and services are available based on the membership of the receiver's institution. The out-of-network transfer processor 122 may also use other information, such as receiving options for transfers to the receiver 104, for determining how to route and execute the transfer from the sender's institution to the receiver's institution.

The out-of-network transfer processor 122 may be configured to facilitate or perform a transfer 162 of the transferable resources from the sender's out-of-network institution 124 to the receiver's in-network institution 128 using service network resources 126 in response to determining that the receiver 104 is a member of an in-network institution. Facilitating the transfer 162 of the transferable resources from the sender 102 to the receiver's in-network institution 128 using service network resource 126 may comprise employing one or more services provided by the service network 110. In one embodiment, facilitating the transfer 162 of the transferable resources from the sender 102 to the receiver's in-network institution 128 using service network resource 126 may comprise employing real-time services. In one embodiment, facilitating the transfer 162 of the transferable resources from the sender 102 to the receiver's in-network institution 128 using service network resource 126 may be based on determined receiving options for the receiver 104.

The out-of-network transfer processor 122 may be configured to perform a transfer 164 of the transferable resources from the sender's out-of-network institution 124 to the receiver's out-of-network institution 132 using secondary network resources 130 in response to determining that the receiver 104 is a member of an out-of-network institution. In one embodiment, facilitating the transfer 164 of the transferable resources from the sender 102 to the receiver's out-of-network institution 132 using secondary network resources 130 may comprise employing non-real-time services.

The out-of-network transfer processor 122 may be further configured to finalize the transfer between the sender 102 and the receiver 104. For example, the out-of-network transfer processor 122 may exchange finalization messages 160 with the receiver's institution to complete the transfer between the sender 102 and the receiver 104. An example of the out-of-network transfer processor 122 facilitating a transfer between the sender 102 and the receiver 104 is described in FIG. 5.

As an example, the finalization messages 160 may be part of a settlement process using wire transfers for exchanging currency between the sender's institution and the receiver's institution when the sender 102 transfers currency to the receiver 104. The finalization messages 160 may part of any other type of process for completing or finalizing the transfer between the sender 102 and the receiver 104.

The service network resources 126 may comprise one or more network devices, modems, switches, routers, bridges, servers, clients, computing devices, any other suitable network device, or combination thereof. The service network resources 126 are associated with the service network 110 and are configured to provide or support service network 110 services for executing a transfer. For example, the service network resources 126 may be configured to provide encryption and/or real-time transfer services. The service network resources 126 may be configured to facilitate the transfer of the transferable resources from the sender's out-of-network institution 124 to the receiver's in-network institution 128. The service network resources 126 may be configured to make routing decisions based on information provided by the out-of-network transfer processor 122, for example, based on information provided in the transfer request 150, the sender token 116, and/or the receiver token 118.

As an example, the service network resources 126 may be configured to provide real-time financial service options for transferring a currency from the sender 102 to the receiver 104. Examples of other financial service options for transferring a currency may include, but are not limited to, wire transfers, cryptocurrency (e.g. bitcoins), prepaid cards, printed checks, cash on demand (e.g. cash pickup), digital wallets, and disaster relief funds.

The secondary network resources 126 are configured may not be configured to provide or support service network 110 services when executing a transfer. For example, the secondary network resources 130 may not be configured to provide real-time transfer services. The secondary network resources 130 may be configured to facilitate the transfer of the transferable resources from the sender's out-of-network institution 124 to the receiver's out-of-network institution 132. The secondary network resources 130 may comprise one or more network devices, modems, switches, routers, bridges, servers, clients, computing devices, any other suitable network device, or combination thereof. The secondary network resources 130 may be configured to make routing decisions based on information provided by the out-of-network transfer processor 122, for example, based on information provided in the transfer request 150, the sender token 116, and/or the receiver token 118.

As an example, the secondary network resource 126 may be configured to provide secondary (e.g. non-real-time) financial service options for transferring a currency from the sender 102 to the receiver 104. Examples of secondary financial service options may include, but are not limited to, original credit transactions and debit card services.

Figure 2:
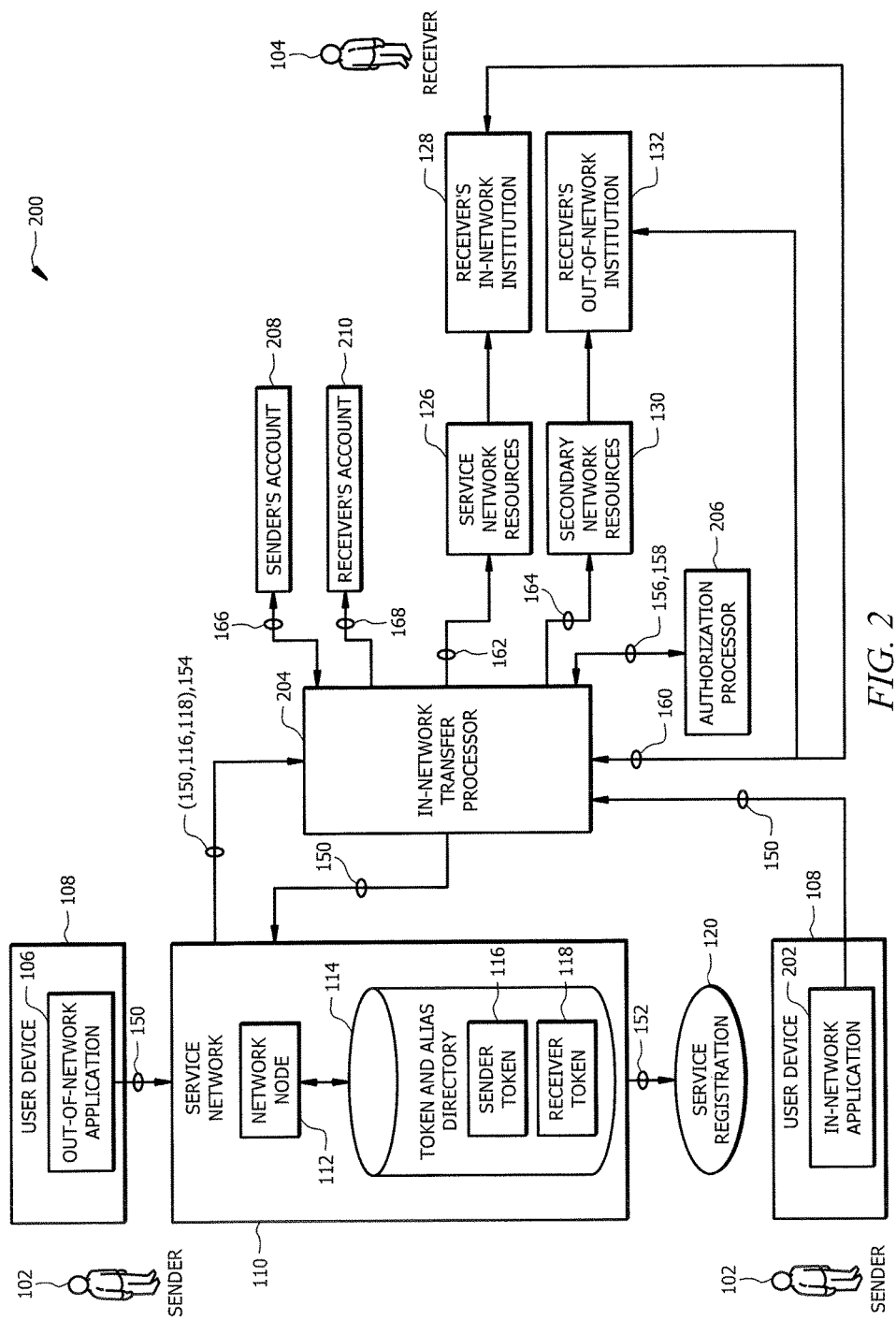
FIG. 2 is a schematic diagram of an embodiment of a token-based routing system configured to support in-network authorization.

FIG. 2 is a schematic diagram of another embodiment of a token-based routing system 200 with in-network authorization. In-network authorization may be employed when a sender 102 is a member of an in-network institution and requests to transfer a transferable resource to a receiver 104. Examples of performing a transfer using in-network authorization are described in FIGS. 4 and 6. The receiver 104 may be a member of an in-network institution or an out-of-network institution. The receiver 104 may be a user that has previously registered for services provided by the service network 110 or may be a user that has not registered with the service network 110.

In one embodiment, the sender 102 may request to make a transfer to the receiver 104 using an out-of-network application 106 similarly to as described in FIG. 1. In such an embodiment, the out-of-network application 106 may be configured to generate a transfer request 150 and to send the transfer request 150 to the network node 112. The network node 112 may be configured to obtain a sender token 116 and a receiver token 118 based on the transfer request 150 and to determine whether the sender 102 is a member of an in-network institution based on the sender token 116. The network node 112 may be further configured to forward the transfer request 150, the sender token 116, and the receiver token 118 to an in-network transfer processor 204 in response to determining that the sender 102 is a member of an in-network institution. In one embodiment, the network node 112 may be configured to generate a composite transfer request 154 similarly to as described in FIG. 1.

In another embodiment, the sender 102 may request to make a transfer to the receiver 104 using an in-network application 202 executed in a user device 108. The in-network application 202 may be a stand alone application that is associated with an in-network institution or a third-party. The in-network application 202 may be configured to authenticate the sender 102, to store user information for the sender 102, and to send transfer request 150 similarly as the out-of-network application 106. The in-network application 202 may be configured to send transfer requests 150 to the service network 110 or to an in-network transfer processor 204 which may forward the transfer request 150 to the service network 110.

The in-network transfer processor 204 may comprise a network interface and a processor operably coupled to the network interface. The network interface may be configured to allow the in-network transfer processor 204 to communicate (e.g. send and receive data) with other network device or computing devices over a network. Examples of the in-network transfer processor 204 include, but are not limited to, computers, network devices, modems, switches, routers, bridges, servers, and clients. The in-network transfer processor 204 may be in data communication with and communicatively coupled to the in-network application 202, the service network 110, one or more network nodes 112 within the service network 110, service network resources 128, and secondary network resources 130. The in-network transfer processor 204 may be associated with the service network 110, an in-network institution, an out-of-network institution, the sender's institution, the receiver's institution, or a third-party processor.

The in-network transfer processor 204 may be configured to receive the transfer request 150 and to forward the transfer request 150 to the service network 110 to obtain a sender token 116 and a receiver token 118. For example, the in-network transfer processor 204 may forward the transfer request 150 to the network node 112. The network node 112 may obtain the sender token 116 and the receiver token 118 from the token and alias directory 114 and send the sender token 116 and the receiver token 118 to the in-network transfer processor 204 similarly to as described in FIG. 1. The in-network transfer processor 204 may be configured to identify an institution associated with the sender 102 based on the received sender token 116 and an institution associated with the receiver 104 based on the received receiver token 118. The in-network transfer processor 204 may receive the transfer request 150, the sender token 116, and the receiver token 118 in response to forwarding the transfer request 150 to the service network 110. The in-network transfer processor 204 is further configured to facilitate a transfer between the sender 102 and the receiver 104 based on the transfer request 150, the sender token 116, and the receiver token 118.

The in-network transfer processor 204 may be configured to seek authorization prior to performing a transfer. The in-network transfer processor 204 may be configured to send a transfer authorization request 156 to an authorization processor 206 in response to receiving the transfer request 150, the sender token 116, and the receiver token 118 from the service network 110. The in-network transfer processor 204 may receive a transfer authorization approval 158 from the authorization processor 206 that indicates an approval for the transfer in response to sending the transfer authorization request 156.

The in-network transfer processor 204 is further configured to determine how to execute the transfer between the sender 102 and the receiver 104 based on the transfer request 150, the sender token 116, and/or the receiver token 118. For example, the in-network transfer processor 204 may be configured to determine receiving options, routing information, delivery speed requirements, security requirements, and/or any other requirements or services associated with the transfer based on the receiver token 118. The in-network transfer processor 204 may be configured to determine how to execute the transfer between the sender 102 and the receiver 104 in a manner similar to the out-of-network transfer processor 122 in FIG. 1.

The in-network transfer processor 204 may be configured to use the user information from the transfer request 150 and/or the receiver token 118 to identify the which resources or services are available based on the membership of the receiver's institution. The in-network transfer processor 204 may also be configured to use other information for determining how to route and/or execute the transfer to the receiver 104. For example, the in-network transfer processor 204 may be configured to determine receiving options for the receiver 104 based on user information from the transfer request 150 and/or the receiver token 118.

The in-network transfer processor 204 may be configured to determine whether the sender 102 and the receiver 104 are members of the same institution. For example, the in-network transfer processor 204 may be configured to compare the sender token 116 and the receiver token 118 to determine whether the sender 102 and the receiver 104 are members of the same institution. The in-network transfer processor 204 may be further configured to determine whether the sender 102 is the same user as the receiver 104 when the in-network transfer processor 204 determines that the sender 102 and the receiver 104 are members of the same institution. For example, the in-network transfer processor 204 may determine whether the sender 102 is the same user as the receiver 104 based on a comparison of the same sender token 116 and the receiver token 118. The in-network transfer processor 204 may determine whether the sender 102 is the same user as the receiver 104 when the sender token 116 matches the receiver token 118. The sender 102 may be the same user as the receiver 104 when the sender 102 requests to make a transfer to themselves, for example, a transfer between accounts 208 owned or controlled by the sender 102. In such an example, the in-network transfer processor 204 may be configured to perform an internal transfer 166 of the transferable resource within the sender's institution when the sender 102 is the same user as the receiver 104. In one embodiment, the internal transfer 166 may be a real-time transfer.

The sender 102 and the receiver 104 may be members of the same institution, but may not be the same user. In such an example, the in-network transfer processor 204 may be configured to perform an internal transfer 168 of the transferable resource to the receiver's account 210 within the sender's and receiver's institution when the sender 102 and receiver 104 are members of the same institution but are not the same user. In one embodiment, the internal transfer 168 may be a real-time transfer.

The in-network transfer processor 204 may be further configured to determine whether the receiver's institution is an in-network institution or an out-of-network institution when the sender 102 and the receiver 104 are not members of the same institution based on the receiver token 118. The in-network transfer processor 204 may be configured to facilitate or perform a transfer 162 of the transferable resources from the sender 102 to the receiver's in-network institution 128 using service network resource 126 in response to determining that the receiver 104 is a member of an in-network institution. Facilitating the transfer 162 of the transferable resources from the sender 102 to the receiver's in-network institution 128 using service network resource 126 may comprise employing one or more services provided by the service network 110. In one embodiment, facilitating the transfer 162 of the transferable resources from the sender 102 to the receiver's in-network institution 128 using service network resource 126 may comprise employing real-time services. In one embodiment, facilitating the transfer 162 of the transferable resources from the sender 102 to the receiver's in-network institution 128 using service network resource 126 may be based on determined receiving options for the receiver 104.

The in-network transfer processor 204 may be configured to facilitate or perform a transfer 164 of the transferable resources from the sender 102 to the receiver's out-of-network institution 132 using secondary network resources 130 in response to determining that the receiver 104 is a member of an out-of-network institution. In one embodiment, facilitating the transfer 164 of the transferable resources from the sender 102 to the receiver's out-of-network institution 132 using secondary network resources 130 may comprise employing non-real-time services.

The in-network transfer processor 204 may be further configured to finalize the transfer between the sender's institution and the receiver's institution similarly to as described in FIG. 1.

The authorization processor 206 is in data communication with the in-network transfer processor 204 and may be associated with the sender's institution, the receiver's institution, or a third-party processor. The authorization processor 206 is configured to receiver transfer authorization requests 156 from the in-network transfer processor 204 and to send a transfer authorization approval 158 to the in-network transfer processor 204 to authorize the transfer and to initiate the transfer from the sender 102.

Figure 3:
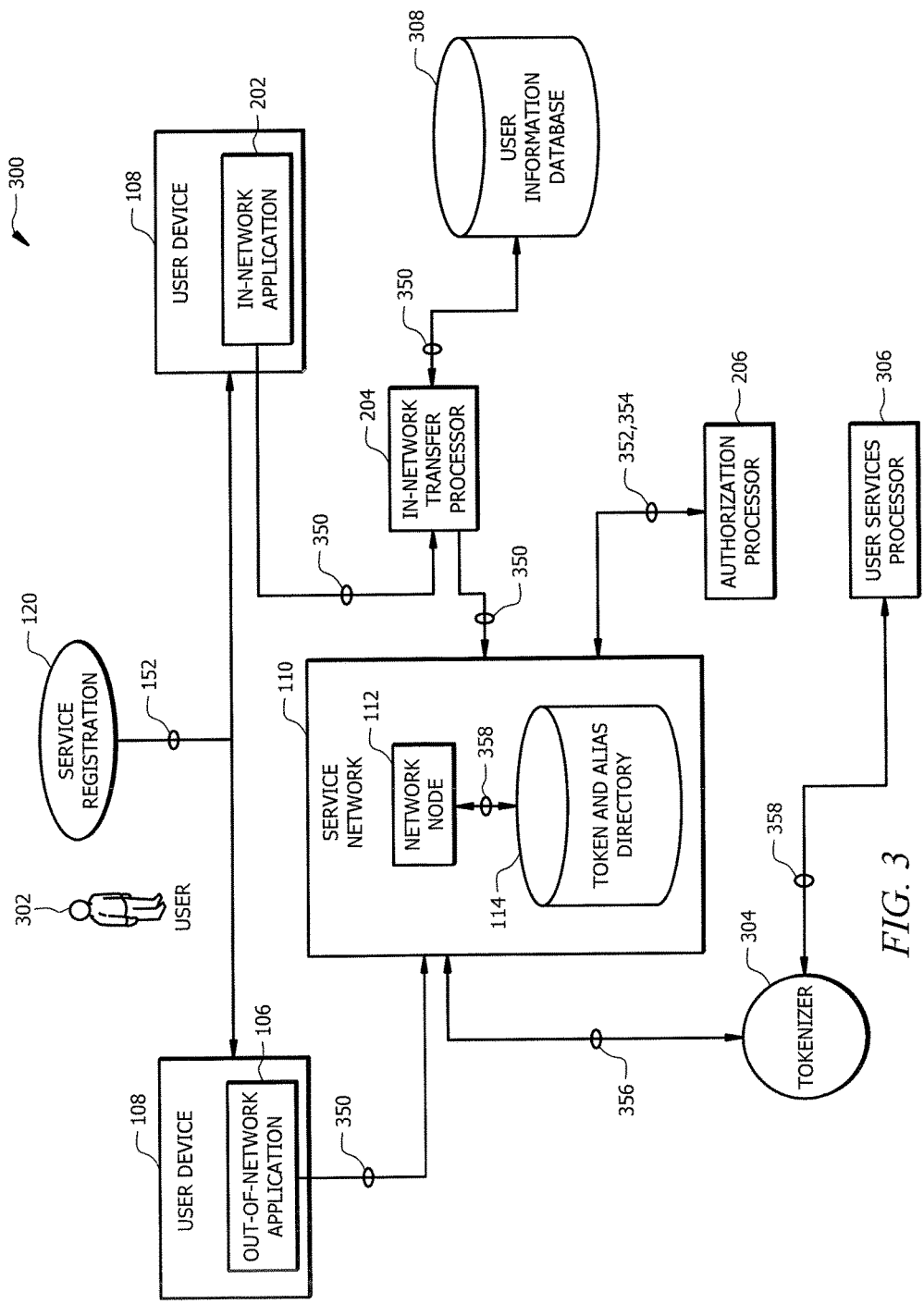
FIG. 3 is a schematic diagram of an embodiment of a tokenization system for token-based network routing.

FIG. 3 is a schematic diagram of an embodiment of a tokenization system 300 for token-based network routing. The tokenization system 300 may be employed for implementing a service registration for generating tokens for a user 302. The user 302 may register or enroll with the service network 110 independently or in response to a registration request 152. For example, the user 302 may be a new receiver requesting to enroll or register for services provided by the service network 110.

Tokenization system 300 is configured to generate a token for the user 302 and to associate one or more services with the user 302 and the generated token. User information associated with user 302 may be stored and associated with a token that may be used for during handoffs when performing transfers among users. Tokens may be used during an out-of-network authorization process, for example, similarly to as described in FIGS. 4 and 5, or during an in-network authorization process, for example, similarly to as described in FIGS. 4 and 6. The use of tokens may allow the identity of the sender 102 and/or the receiver 104 to be unknown outside of the service network 110.

The user 302 may register with the service network 110 using a graphical user interface on an out-of-network institution web page, an out-of-network application 108, an in-network institution web page, an in-network application 202, or any other suitable user interface. In one example, an out-of-network application 106 in a user device 108 receives the registration request 152. The out-of-network application 106 may be configured to obtain user information 350 from the user 302 and to forward the user information 350 to the service network 110 in response to receiving the registration request 152.

A network node 112 of the service network 110 may be configured to receive the user information 350 and to determine whether the user 302 is a member of an in-network institution based on the user information 350. The network node 112 may be configured to authenticate the user 302 when the user 302 is a member of an in-network institution. For example, the network node 112 may be configured to send an authorization request 352 to an authorization processor 206 when the user 302 is a member of an in-network institution and to receive an authorization approval 354 in response to sending the authorization request 352. In one embodiment, the authorization request 352 may comprise at least a portion of the use information 350. In one embodiment, the network node 112 may be configured to not send the authorization request 352 to the authorization processor 206 when the user 302 is not a member of an in-network institution.

The network node 112 is in data communication with and communicatively coupled with a tokenizer 304 and may be configured to send a token request 356 to the tokenizer 304 to generate a token 358 for the user 302. In an embodiment, the token request 356 may comprise at least a portion of the user information 350. The network node 112 may be configured to receive the token 358 in response to sending the token request 356 and to store the token 358 in the token and alias directory 114. Storing the token 358 in the token and alias directory 114 may associate the user 302 and/or user information 350 with the token 358.

The tokenizer 304 may be software or firmware that is executed in hardware (e.g. one or more processors). The tokenizer 304 is configured to generate a token 358 in response to receiving a token request 356. The token 358 may be used during an out-of-network authorization process, for example, similarly to as described in FIGS. 4 and 5, or during an in-network authorization process, for example, similarly to as described in FIGS. 4 and 6. For example, the token 358 may be used as a sender token 116 or a receiver token 118. The token 358 may be randomly generated or generated based on at least a portion of the user information 350. Any suitable technique for generating a token 358 may be employed as would be appreciated by one of ordinary skill in the art upon viewing this disclosure. The tokenizer 304 may be further configured to send the token 358 to a user service processor 306 to associate the token 358 and the user 302 with one or more services of the service network 110.

The user service processor 306 may be software or firmware that is executed in hardware (e.g. one or more processors). The user service processor 306 is in data communication with the tokenizer 304. The user service processor 306 may be configured to receive information about the token 358 and/or user information 350 and to associate the token 358 and the user 302 with one or more services of the service network 110. For example, the user service processor 306 may be configured to associated encryption, real-time transfer services, or any other kind of services with the user 302 and the token 358. The user service processor 306 may be associated with the service network 110, the sender's institution, the receiver's institution, or a third-party processor.

In another example, the registration request 152 is received by an in-network application 202 in a user device 108. The in-network application 202 may be configured to obtain user information 350 from the user 302 and to forward the user information 350 to an in-network transfer processor 204 in response to receiving the registration request 152. The in-network transfer processor 204 may be configured to authenticate the user 302 when the user 302. For example, the in-network transfer processor 204 may be in data communication with a user information database 308 and may be configured to access the user information database 308 to look-up or validate the user 302 based on the user information 350. The in-network transfer processor 204 may be further configured to send the user information 350 to the service network 110 to generate a token 358, to associate services with the user 302 and/or token 358, and to store the generated token 358 in the token and alias directory 114 similarly to as previously described.

Figure 4:
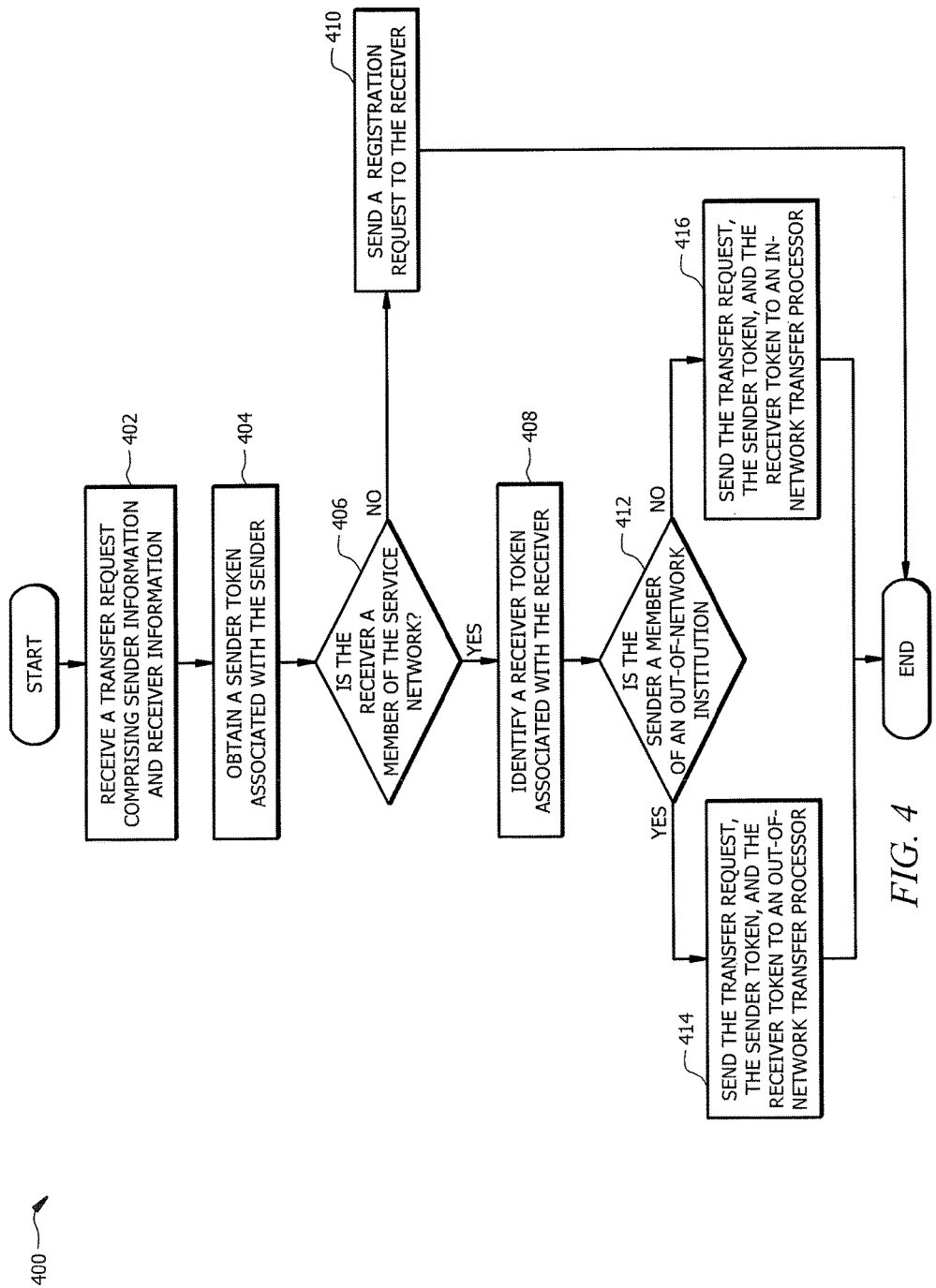
FIG. 4 is a flowchart of an embodiment of a method for token-based routing in a token-based routing system.

FIG. 4 is a flowchart of an embodiment of a method 400 for token-based routing in a token-based routing system such as token-based routing system 100 and token-based routing system 200. Method 400 may be implemented by a network node 112 of the service network 110 to route and forward a transfer request 150 from a sender 102 to an out-of-network transfer processor 122 or an in-network transfer processor 204. The network node 112 may forward the transfer request 150 to initiate a transfer between the sender 102 and a receiver 104.

At step 402, the network node 112 receives a transfer request 150 comprising user information associated with the sender 102 and user information associated with receiver 104. The network node 112 may receive the transfer request 150 from an out-of-network application 106 or an in-network application 202. The transfer request 150 may comprise user information associated with the sender 102, user information associated with the receiver 104, and a transferable resource identifier.

At step 404, the network node 112 obtains a sender token 116 associated with the sender 102 based on the transfer request 150. For example, the network node 112 may use the user information associated with the sender 102 to request the sender token 116 from the token and alias directory 114. In another example, the network node 112 may use the user information associated with the sender 102 to identify the sender token 116 from the token and alias directory 114, for example, by performing a look-up using the user information associated with the sender 102.

At step 406, the network node 112 determines whether the receiver 104 is a member of the service network 110. The network node 112 may determine whether the receiver 104 is a member of the service network 110 based on the user information associated with the receiver 104. In one embodiment, the network node 112 may use the user information associated with the receiver 104 to request a receiver token 118 from the token and alias directory 114. The network node 112 may determine that the receiver 104 is a member of the service network 110 when a receiver token 118 exists and may determine that the receiver 104 is not a member of the service network 110 when a receiver token 118 does not exist. The network node 112 may proceed to step 408 when the receiver's institution is a member of the service network 110. Otherwise, the network node 112 may proceed to step 410 when the receiver's institution is not a member of the service network 110.

At step 410, the network node 112 sends a registration request 152 to the receiver 104. For example, the registration request 152 may comprise an invitation for the receiver 104 to join the service network 110. The network node 112 may send the registration request 152 to the receiver via an email, a text, or any other suitable medium as would be appreciated by one of ordinary skill in the art upon viewing this disclosure. In another embodiment, the network node 112 may send a notification to the sender 102 that indicates that the receiver 104 is not a member of the service network 110 and that the transfer may not be performed. In yet another embodiment, step 410 may be omitted and method 400 may terminate.

Returning to step 406, the network node 112 may proceed to step 408 when the receiver 104 is a member of the service network 110. At step 408, the network node 112 identifies a receiver token 118 that is associated with the receiver 104. For example, the network node 112 may send a request to the token and alias directory 114 for the receiver token 118 using the user information associated with the receiver 104.

At step 412, the network node 112 determines whether the sender 102 is a member of an out-of-network institution. The network node 112 may determine whether sender 102 is a member of an out-of-network institution based on the sender token 116 and/or the user information associated with the sender 102. For example, the sender token 116 may indicate that the sender 102 is a member of an out-of-network institution or an in-network institution. The network node 112 proceeds to step 414 when the sender 102 is a member of an out-of network institution. Otherwise, the network node 112 may proceed to step 416 when the sender 102 is not a member of an out-of-network institution.

At step 414, the network node 112 may forward the transfer request 150, the sender token 116, and the receiver token 118 to an out-of-network transfer processor 122. In one embodiment, the network node 112 may generate a composite transfer request 154 that comprises the transfer request 150, the sender token 116, and the receiver token 118 and forward the composite transfer request 154 to the out-of-network transfer processor 122. The out-of-network transfer processor 122 may be configured to use out-of-network authorization to authorize and to facilitate the transfer between the sender 102 and the receiver 104. An example of performing out-of-network authorization is described in FIG. 5.

Returning to step 412, the network node 112 may proceed to step 416 when the network node 112 determines that the sender 102 is not a member of an out-of-network institution. At step 416, the network node 112 may forward the transfer request 150, the sender token 116, and the receiver token 118 to an in-network transfer processor 204. In one embodiment, the network node 112 may generate a composite transfer request 154 that comprises the transfer request 150, the sender token 116, and the receiver token 118 and forward the composite transfer request 154 to the in-network transfer processor 204. The in-network transfer processor 204 may be configured to use in-network authorization to authorize and to facilitate the transfer between the sender 102 and the receiver 104. An example of performing in-network authorization is described in FIG. 6.

Figure 5:
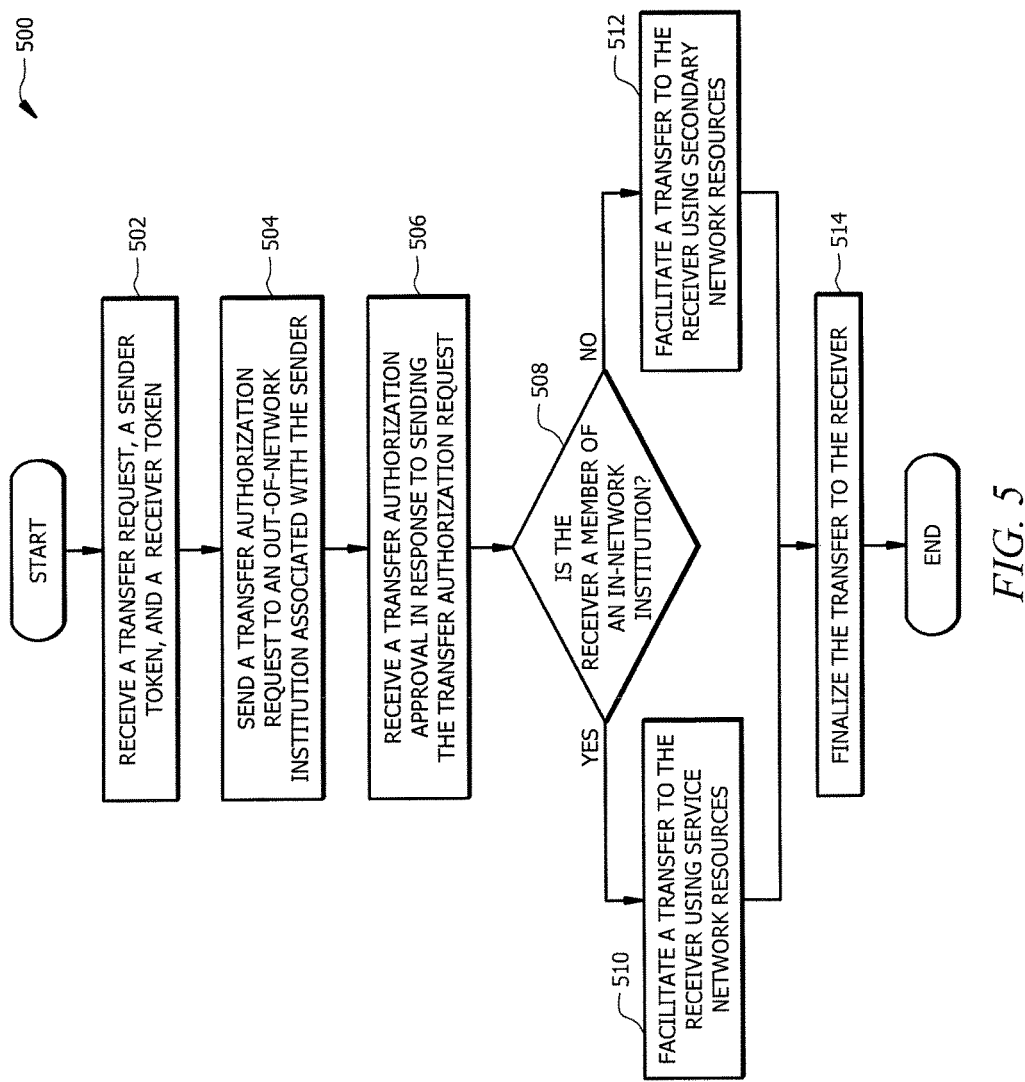
FIG. 5 is a flowchart of an embodiment of a method for token-based routing with out-of-network authorization.

FIG. 5 is a flowchart of an embodiment of a method 500 for out-of network authorization in a token-based routing system 100. Method 500 may be implemented by an out-of network transfer processor 122 to authorize and facilitate a transfer between a sender 102 that is a member of an out-of-network institution and a receiver 104.

At step 502, the out-of-network transfer processor 122 receives a transfer request 150, a sender token 116, and a receiver token 118 from a network node 112 of the service network 110. For example, the out-of-network transfer processor 122 may receive the transfer request 150, the sender token 116, and the receiver token 118 in response to the network node 112 determining that the sender 102 is a member of an out-of-network institution. The out-of-network transfer processor 122 may use the sender token 116 and/or user information associated with the sender 102 from the transfer request 150 to identify the sender's out-of-network institution 124. For example, the sender token 116 may indicate that the sender 102 identify or be associated with the sender's out-of-network institution 124. Alternatively, the user information associated with the sender 102 may identify the sender's out-of-network institution 124.

At step 504, the out-of-network transfer processor 122 sends a transfer authorization request 156 to the sender's out-of-network institution 124. The transfer authorization request 156 may be a request for authorization from the sender's out-of-network institution 124 to execute a transfer from the sender 102. In an embodiment, the transfer authorization request 156 may comprise information from the transfer request 150, the sender token 116, and/or the receiver token 118. At step 506, the out-of-network transfer processor 122 receives a transfer authorization approval 158 from the sender's out-of-network institution 124 in response to sending the transfer authorization request 156. The transfer authorization approval 158 may indicate an approval for the transfer from the sender 102. In one embodiment, steps 504 and 506 may be optional and omitted. For example, steps 504 and 506 may be omitted when authorization to facilitate a transfer is not required.

Upon authorizing the transfer, the out-of-network transfer processor 122 may determine how to facilitate the transfer based on the receiver token 118. At step 508, the out-of-network transfer processor 122 determines whether the receiver 104 is a member of an in-network institution based on the receiver token 118 and/or user information associated with the receiver 104 from the transfer request 150. For example, the receiver token 118 may indicate that the receiver 104 is a member of an in-network institution or an out-of-network institution. The out-of-network transfer processor 122 may proceed to step 510 when the out-of-network transfer processor 122 determines that the receiver 104 is a member of an in-network institution 128. Otherwise, the out-of-network transfer processor 122 may proceed to step 512 when the out-of-network transfer processor 122 determines that the receiver 104 is not a member of an in-network institution 128. In other words, the out-of-network transfer processor 122 may proceed to step 512 when the out-of-network transfer processor 122 determines that the receiver 104 is a member of an out-of-network institution 132.

At step 510, the out-of-network transfer processor 122 facilitates a transfer 162 of the transferable resource to the receiver 104 (e.g. the receiver's in-network institution 128) using service network resources 126. The out-of-network transfer processor 122 may employ the service network resources 126 to utilize the resources and/or one or more services of the service network 110 for the transfer. For example, the out-of-network transfer processor 122 may use the service network resources 126 to provide real-time financial services to transfer a currency from the sender 102 to the receiver 104.

Returning to step 508, the out-of-network transfer processor 122 may proceed to step 512 when the out-of-network transfer processor 122 determines that the receiver 104 is not a member of an in-network institution 128. At step 512, the out-of-network transfer processor 122 facilitates a transfer 164 of the transferable resource to the receiver 104 (e.g. the receiver's out-of-network institution 132) using secondary network resources 130. The out-of-network transfer processor 122 may employ the secondary network resources 130 to route and facilitate the transfer 164. For example, the out-of-network transfer processor 122 may use non-real-time financial services (e.g. a debit card network) to transfer a currency from the sender 102 to the receiver 104.

At step 514, the out-of-network transfer processor 122 finalizes the transfer to the receiver 104 and/or the receiver's institution. The out-of-network transfer processor 122 may communicate one or more messages between the sender 102 (e.g. the sender's institution) and the receiver 104 (e.g. the receiver's institution) to complete the transfer. For example, the out-of-network transfer processor 122 may perform a settlement process with the receiver's institution to finalize the transfer when a currency is transferred from the sender 102 to the receiver 104. Alternatively, the out-of-network transfer processor 122 may perform any other process to finalize the transfer as would be appreciated by one of ordinary skill in the art upon viewing this disclosure.

Figure 6:
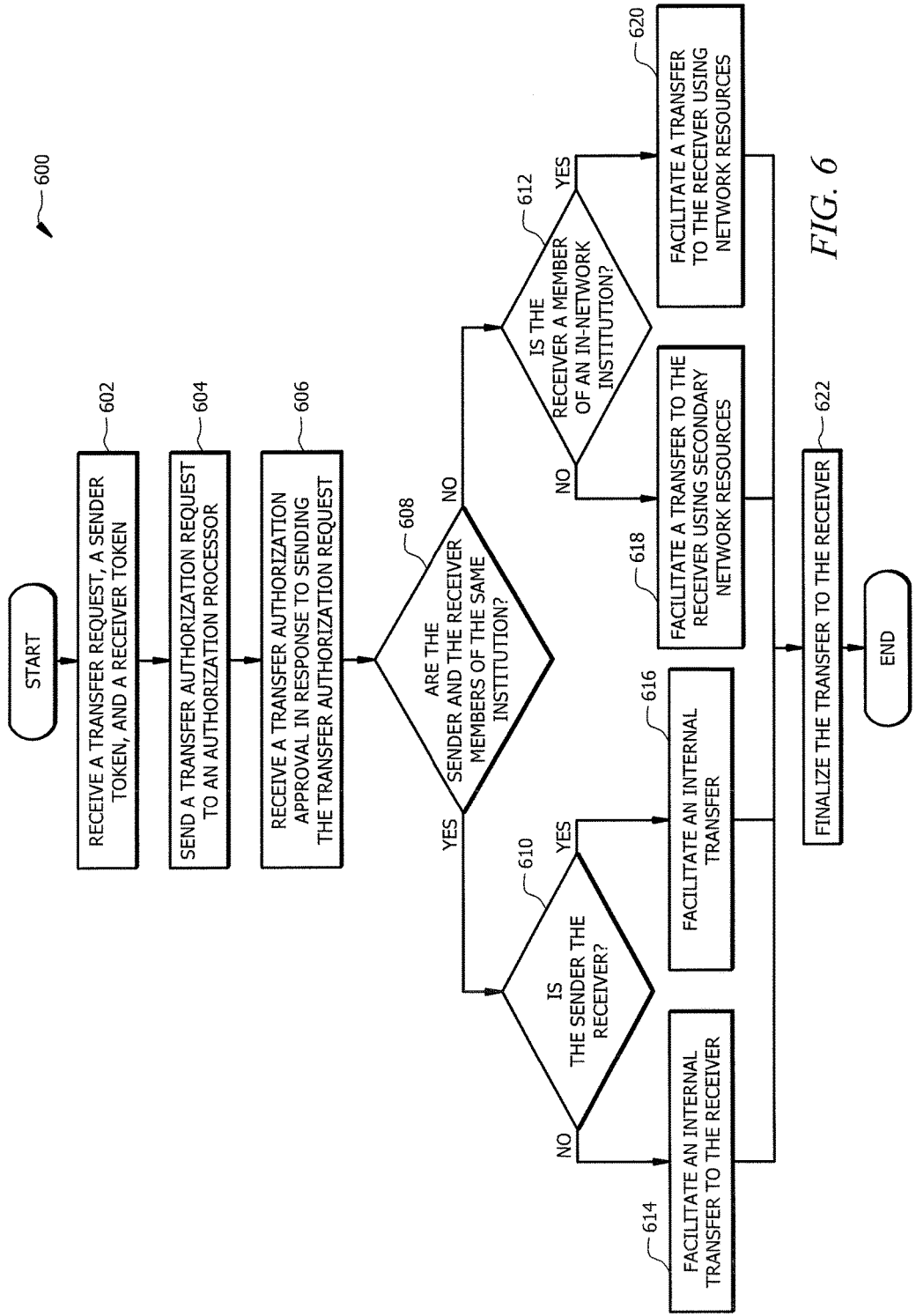
FIG. 6 is a flowchart of another embodiment of a method for token-based routing with in-network authorization.

FIG. 6 is a flowchart of an embodiment of a method 600 for in-network authorization in a token-based routing system 200. Method 600 may be implemented by an in-network transfer processor 204 to authorize and facilitate a transfer between a sender 102 that is a member of an in-network institution and a receiver 104.

At step 602, the in-network transfer processor 204 receives a transfer request 150, a sender token 116, and a receiver token 118 from a network node 112 of the service network 110. For example, the in-network transfer processor 204 may receive the transfer request 150, the sender token 116, and the receiver token 118 in response to the network node 112 determining that the sender 102 is a member of an in-network institution. The in-network transfer processor 204 may use the sender token 116 and/or user information associated with the sender 102 from the transfer request 150 to identify the sender's in-network institution 208. For example, the sender token 116 may indicate that the sender 102 is associated with the sender's in-network institution. Alternatively, the user information associated with the sender 102 may identify the sender's in-network institution. In one embodiment, the in-network transfer processor 204 may use the receiver token 118 and/or user information associated with the receiver 104 from the transfer request 150 to identify the receiver's institution. For example, the receiver token 118 may indicate that the receiver's institution.

At step 604, the in-network transfer processor 204 sends a transfer authorization request 156 to an authorization processor 206 in response to receiving the transfer request 150. The transfer authorization request 156 may be a request for authorization from the sender's in-network institution 208 to execute a transfer from the sender 102. In one embodiment, the transfer authorization request 156 may comprises information from the transfer request 150, the sender token 116, and/or the receiver token 118. At step 606, the in-network transfer processor 204 receives a transfer authorization approval 158 from the authorization processor 206 in response to sending the transfer authorization request 156. The transfer authorization approval 158 may indicate an approval for the transfer from the sender 102. In one embodiment, steps 604 and 606 may be optional and omitted. For example, steps 604 and 606 may be omitted. For example, steps 604 and 606 may be omitted when authorization to facilitate a transfer is not required.

Upon authorizing the transfer, the in-network transfer processor 204 may determine how to facilitate the transfer based on the receiver token 118. At step 608, the in-network transfer processor 204 determines whether the sender 102 and the receiver 104 are members of the same institution based on the receiver token 118 and/or user information associated with the receiver 104 from the transfer request 150. For example, the in-network transfer processor 204 may determine whether the sender 102 and the receiver 104 are members of the same institution by comparing the sender token 116 and the receiver token 118 and/or the user information associated with the sender 102 and the user information associated with the receiver 104. The in-network transfer processor 204 may determine the sender 102 and the receiver 104 are members of the same institution when a match is found, for example, the sender token 116 is the same as the receiver token 118. The in-network transfer processor 204 may proceed to step 610 when the in-network processor 204 determines that the sender 102 and the receiver 104 are members of the same institution. Otherwise, the in-network processor 204 may proceed to step 612 when the sender 102 and receiver 104 are not members of the same institution.

At step 610, the in-network transfer processor 204 determines whether the sender 102 is the same user as the receiver 104. In other words, the in-network transfer processor 204 may determine whether sender 102 is requesting a transfer to themselves. The in-network transfer processor 204 may compare the sender token 116 with the receiver token 118 to determine whether the sender 102 is the same user as the receiver 104. For example, the in-network transfer processor 204 may determine that the sender 102 is the same user as the receiver 104 when the sender token 116 is the same as the receiver token 118. Alternatively, the in-network transfer processor 204 may determine that the sender 102 is the same user as the receiver 104 based on the user information associated with the sender 102 and the user information associated with the receiver 104. The in-network transfer processor 204 may proceed to step 614 when the sender 102 is not the same user as the receiver 104. Otherwise, the in-network transfer processor 204 may proceed to step 616 when the sender is the same user as the receiver.

At step 614, the in-network transfer processor 204 facilitates an internal transfer 166 of the transferable resources to the receiver 104 (e.g. the receiver's account 210). The in-network transfer 204 may perform an internal transfer 166 using resources of the in-network institution associated with the sender 102 and the receiver 104. As an example, the in-network transfer processor 204 may perform a transfer from an account associated with the sender 102 within the in-network institution to an account associated with the receiver 104 within the in-network institution.

Returning to step 610, the in-network transfer processor 204 may proceed to step 616 when the sender 102 is the same user as the receiver. At step 616, the in-network transfer processor 204 facilitates an internal transfer 168 of the transferable resources for the sender 102 (e.g. the sender's account 208). The in-network transfer processor 204 may perform an internal transfer 168 using resources of the sender's in-network institution 208. As an example, the in-network transfer processor 204 may perform a transfer from a first account associated with the sender 102 to a second account associated with the sender 102 within the sender's institution 208.

Returning to step 608, the in-network transfer processor 204 may proceed to step 612 when the sender 102 and receiver 104 are not members of the same institution. At step 612, the in-network transfer processor 204 determines whether the receiver 104 is a member of an in-network institution 128 based on the receiver token 118 and/or user information associated with the receiver 104. For example, the receiver token 118 may indicate that the receiver 104 is a member of an in-network institution or an out-of-network institution. The in-network transfer processor 204 may proceed to step 618 when the receiver 104 is not a member of an in-network institution 128. In other words, the in-network transfer processor 204 may proceed to step 618 when the in-network transfer processor 204 determines that the receiver 104 is a member of an out-of-network institution 132.

At step 618, the in-network transfer processor 204 facilitates a transfer 164 of the transferable resources to the receiver 104 (e.g. the receiver's out-of-network institution 132) using secondary network resources 130. The in-network transfer processor 204 may employ the secondary network resources 130 to route and facilitate the transfer. For example, the in-network transfer processor 204 may employ non-real-time financial services (e.g. a debit card network) to transfer a currency from the sender 102 to the receiver 104.

Returning to step 612, the in-network transfer processor 204 may proceed to step 620 when the in-network transfer processor 204 determines that the receiver 104 is a member of an in-network institution 128. At step 620, the in-network transfer processor 204 facilitates a transfer 162 of the transferable resources to the receiver 104 (e.g. the receiver's in-network institution 128) using service network resources 126. The in-network transfer processor 204 may employ the service network resources 126 to utilize the resources and/or one or more services of the service network 110 for the transfer. For example, the in-network transfer processor 204 may employ the service network resources 126 to provide real-time financial services to transfer a currency from the sender 102 to the receiver 104.

At step 622, the in-network transfer processor 204 finalizes the transfer to the receiver 104 and/or the receiver's institution. The in-network transfer processor 204 may communicate one or more messages between the sender 102 (e.g. the sender's institution) and the receiver 104 (e.g. the receiver's institution) to complete the transfer. For example, the in-network transfer processor 204 may perform a settlement process with the receiver's institution to finalize the transfer when currency is transferred from the sender 102 to the receiver 104. Alternatively, the in-network transfer processor 204 may perform any other process to finalize the transfer as would be appreciated by one of ordinary skill in the art upon viewing this disclosure.

Figure 7:
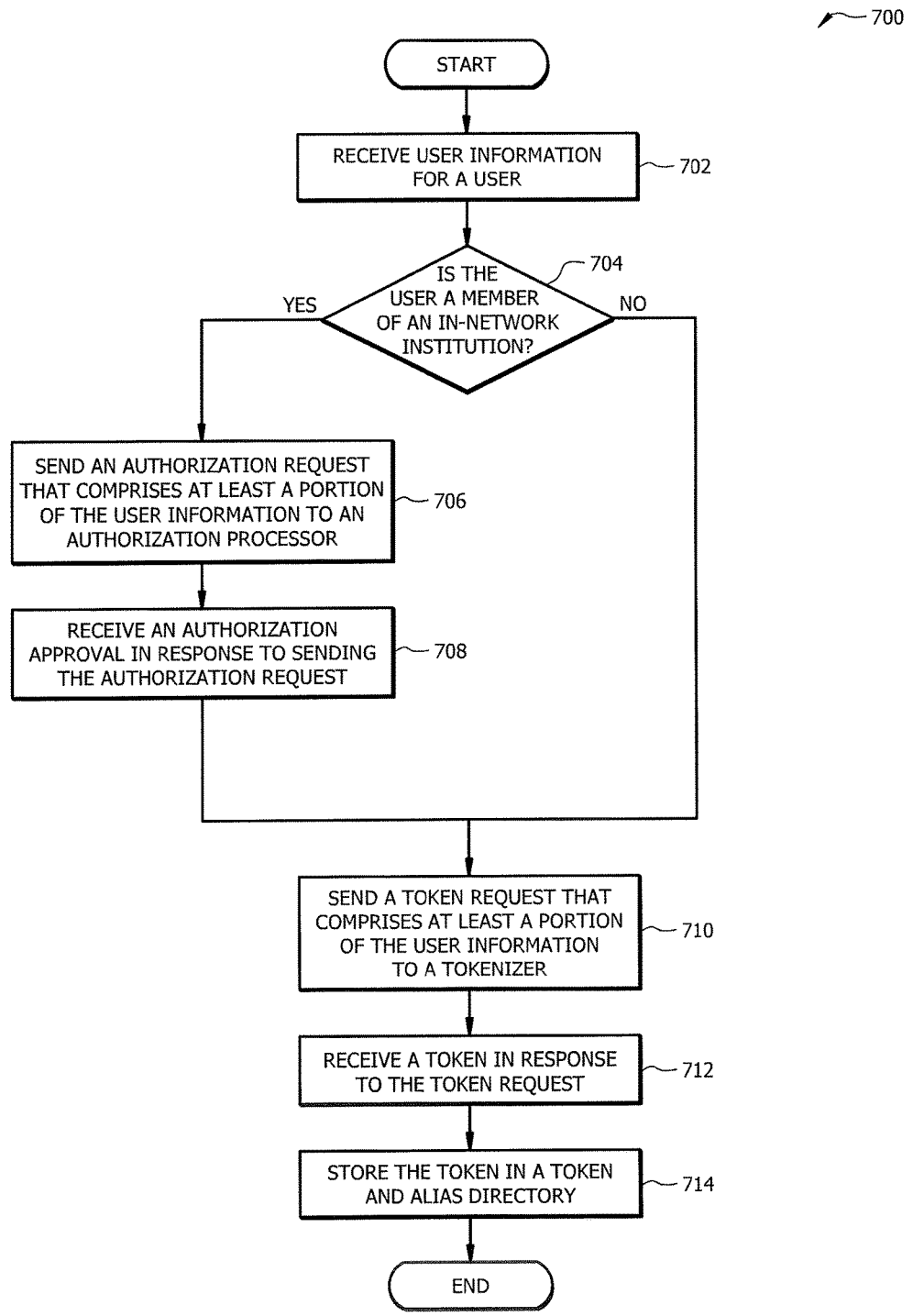
FIG. 7 is a flowchart of an embodiment of a method for tokenization for a token-based routing system.

FIG. 7 is a flowchart of an embodiment of a method 700 for tokenization for a tokenization system 300. Method 700 may be implemented by a network node 112 of the service network 110 to generate a token for a user 302. The network node 12 may use the generated token to facilitate transfers between the user 302 and other users using a token-based routing system such as token-based routing system 100 and token-based routing system 200. For example, the generated token may be used as a sender token 116 or a receiver token 118.

At step 702, the network node 112 receives user information 350 for a user 302. User information may include, but is not limited to, user identifiers, aliases, tokens, names, addresses, email addresses, phone numbers, network information, institution information, financial information, services information, and user preferences.

At step 704, the network node 112 determines whether the user 302 is a member of an in-network institution based on the user information 350. For example, the user information 350 may identify the user's institution. The network node 112 may use the user's institution to determine whether the user 302 is a member of an in-network institution. The network node 112 may proceed to step 706 when the network node 112 determines that the user 302 is a member of an in-network institution. Otherwise, the network node 112 may proceed to step 710 when the network node 112 determines that the user 302 is not a member of an in-network institution.

At step 706, the network node 112 sends an authorization request 352 that comprises user information 350 to an authorization processor 206 in response to determining that the user 302 is a member of an in-network institution. The authorization request 352 may comprise a request to validate or authenticate the identity of the user 302.

At step 708, the network node 112 receives an authorization approval 354 in response to sending the authorization request 352. The authorization approval 354 may indicate the identity of the user has been authenticated.

At step 710, the network node 112 sends a token request 356 that comprises at least a portion of the user information 350 to the tokenizer 304. For example, the token request 356 may comprise information about the user's institution and/or user preferences such as receiving options for transfers.

At step 712, the network node receives a token 358 for the user 302 in response to sending the token request 356. The token 358 may be associated with one or more services. For example, the tokenizer 304 may send the token 358 to the user services processor 306 to associated the token 358 and the user 302 with one or more services. For example, the token 358 may be associated with encryption and/or real-time transfer services. Alternatively, the token 358 may be associated with any other services.

At step 714, the network node 112 stores the token 358 in the token and alias directory 114. The network node 112 may store the token 358 such that the token 358 may be requested or looked up in response to receiving a transfer request 150.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A token-based routing system comprising:
a service network comprising service network resources configured to provide one or more real time services;
secondary network resources configured to provide one or more non-real time services;
one or more network nodes coupled with a memory which stores a token and alias directory within the service network, wherein the one or more network nodes are configured to:
receive a transfer request comprising user information associated with a sender and user information associated with a receiver;
attempt to obtain a sender token associated with the sender and a receiver token associated with the receiver from the token and alias directory based on the transfer request;
initiate a service registration to the receiver to generate the receiver token if the receiver token is not obtained from the token and alias directory; and
generate a composite transfer request comprising the transfer request, the sender token and the receiver token; and an out-of-network transfer processor communicatively coupled to the service network resources, the secondary network resources, and the one or more network nodes, and configured to:
receive the composite transfer request comprising the transfer request, the sender token, and the receiver token, wherein the receiver token indicates receiving options and delivery speed requirements associated with executing a transfer to the receiver;
identify an institution associated with the sender based on the sender token;
send a transfer authorization request to the institution associated with the sender in response to receiving the composite transfer request;
receive a transfer authorization approval in response to sending the transfer authorization request;
determine a membership for an institution associated with the receiver based on the receiver token;
facilitate a transfer from the institution associated with the sender to the receiver using the service network resources in response to determining that the membership for the institution associated with the receiver indicates an in-network institution, wherein facilitating the transfer from the institution associated with the sender to the institution associated with the receiver using the service network resources comprises:
selecting a service from among the one or more real time services provided by the service network based on the receiving options and the deliver speed requirements associated with executing a transfer to the receiver; and
employing the selected service to execute the transfer to the receiver; and
facilitate a transfer from the institution associated with the sender to the institution associated with the receiver using the secondary network resources in response to determining that the membership for the institution associated with the receiver indicates an out-of-network institution.

2. The system of claim 1, wherein the out-of-network transfer processor is configured to communicate one or more messages to finalize the transfer to the receiver.

3. The system of claim 1, wherein the institution associated with the sender is an out-of-network institution.

4. The system of claim 1, wherein the transfer request comprises a transferable resource identifier.

5. An apparatus comprising:
a network interface;
a memory which stores a token and alias directory;
one or more processors coupled with the memory and the network interface, and configured to:
receive a transfer request comprising user information associated with a sender and user information associated with a receiver;
attempt to obtain a sender token associated with the sender and a receiver token associated with the receiver from the memory based on the transfer request;
initiate a service registration to the receiver to generate the receiver token if the receiver token is not obtained from the memory; and
generate a composite transfer request comprising the transfer request, the sender token and the receiver token; and an out-of-network transfer processor, implemented by the one or more processors operably coupled to the network interface, and configured to:
receive the composite transfer request comprising the transfer request, the sender token, and the receiver token, wherein the receiver token indicates receiving options and deliver speed requirements associated with executing a transfer to the receiver;
identify an institution associated with the sender based on the sender token;
send a transfer authorization request to the institution associated with the sender in response to receiving the composite transfer request;
receive a transfer authorization approval in response to sending the transfer authorization request;
determine a membership for an institution associated with the receiver based on the receiver token;
facilitate a transfer from the institution associated with the sender to the receiver using service network resources in response to determining that the membership for the institution associated with the receiver indicates an in-network institution, wherein facilitating the transfer from the institution associated with the sender to the institution associated with the receiver using the service network resources comprises:
selecting a service from among one or more real time services provided by the service network resources based on the receiving options and the delivery speed requirements associated with executing a transfer to the receiver; and
employing the selected service to execute the transfer to the receiver; and
facilitate a transfer from the institution associated with the sender to the institution associated with the receiver using secondary network resources in response to determining that the membership for the institution associated with the receiver indicates an out-of-network institution, wherein facilitating the transfer from the institution associated with the sender to the institution associated with the receiver using the secondary network resources comprises using a non-real time service.

6. The apparatus of claim 5, wherein the out-of-network transfer processor is configured to communicate one or more messages to finalize the transfer to the receiver.

7. The apparatus of claim 5, wherein the institution associated with the sender is an out-of-network institution.

8. The apparatus of claim 5, wherein the transfer request comprises a transferable resource identifier.

9. A token-based routing method comprising:
receiving, at one or more network nodes, a transfer request comprising user information associated with a sender and user information associated with a receiver;
attempting to obtain, from a memory which stores a token and alias directory, a sender token associated with the sender and a receiver token associated with the receiver based on the transfer request;
initiating, by the one or more network nodes, a service registration to the receiver to generate the receiver token if the receiver token is not obtained from the token and alias directory;
generating, by the one or more network nodes, a composite transfer request comprising the transfer request, the sender token and the receiver token;
receiving, at an out-of-network transfer processor, the composite transfer request comprising the transfer request, the sender token, and the receiver token, wherein the receiver token indicates receiving options and delivery speed requirements associated with executing a transfer to the receiver;
identifying, by the out-of-network transfer processor, an institution associated with the sender based on the sender token;
sending, by the out-of-network transfer processor, a transfer authorization request to the institution associated with the sender in response to receiving the composite transfer request;
receiving, by the out-of-network transfer processor, a transfer authorization approval in response to sending the transfer authorization request;
determining, by the out-of-network transfer processor, a membership for an institution associated with the receiver based on the receiver token;
facilitating, by the out-of-network transfer processor, a transfer from the institution associated with the sender to the receiver using service network resources in response to determining that the membership for the institution associated with the receiver indicates an in-network institution, wherein facilitating the transfer from the institution associated with the sender to the institution associated with the receiver using the service network resources comprises:
selecting a service from among one or more real time services provided by the service network resources based on the receiving options and the delivery speed requirements associated with executing a transfer to the receiver; and
employing the selected service to execute the transfer to the receiver; and
facilitating, by the out-of-network transfer processor, a transfer from the institution associated with the sender to the institution associated with the receiver using secondary network resources in response to determining that the membership for the institution associated with the receiver indicates an out-of-network institution, wherein facilitating the transfer from the institution associated with the sender to the institution associated with the receiver using the secondary network resources comprises using a non-real time service.

10. The method of claim 9, further comprising communicating one or more messages to finalize the transfer to the receiver.

11. The method of claim 9, wherein the institution associated with the sender is an out-of-network institution.

12. The method of claim 9, wherein the transfer request comprises a transferable resource identifier.

* * * * *

UNITED STATES PATENT AND TRADEMARK OFFICE
CERTIFICATE OF CORRECTION

PATENT NO. : 10,158,644 B2
APPLICATION NO. : 15/151821
DATED : December 18, 2018
INVENTOR(S) : Richard H. Thomas and Joseph B. Castinado Page 1 of 1

It is certified that error appears in the above-identified patent and that said Letters Patent is hereby corrected as shown below:

In the Claims

Column 22, Line 30, delete "deliver", insert --delivery--.

Signed and Sealed this
Twenty-fourth Day of March, 2020

Andrei Iancu
*Director of the United States Patent and Trademark Office*